United States Patent [19]

Geisthoff

[11] Patent Number: 4,568,312
[45] Date of Patent: Feb. 4, 1986

[54] PROFILED HUB FOR DRIVE SHAFT ASSEMBLY

[75] Inventor: Hubert Geisthoff, Lohmar, Fed. Rep. of Germany

[73] Assignee: Jean Walterscheid GmbH, Lohmar, Fed. Rep. of Germany

[21] Appl. No.: 583,936

[22] Filed: Feb. 27, 1984

[30] Foreign Application Priority Data

Apr. 16, 1983 [DE] Fed. Rep. of Germany ....... 3313834

[51] Int. Cl.$^4$ .............................................. F16D 3/06
[52] U.S. Cl. .................................................. 464/162
[58] Field of Search .................. 464/162, 158, 183, 88

[56] References Cited

U.S. PATENT DOCUMENTS

| | | | |
|---|---|---|---|
| 2,695,504 | 11/1954 | Magee | 464/162 |
| 3,293,884 | 12/1966 | Grob | 464/162 |
| 3,400,558 | 9/1968 | Haines | 464/162 |
| 3,618,340 | 11/1971 | Geisthoff et al. | 464/162 |
| 4,146,034 | 3/1979 | Gupta | 285/176 X |
| 4,460,182 | 7/1984 | Brissette | 464/162 X |

FOREIGN PATENT DOCUMENTS 1002169  2/1957  Fed. Rep. of Germany .
881355  11/1961  United Kingdom ................ 464/162

Primary Examiner—Stephen Marcus
Assistant Examiner—L. J. Peters
Attorney, Agent, or Firm—Toren, McGeady, Stanger, Goldberg & Kiel

[57] ABSTRACT

In a drive shaft assembly particularly for agricultural implements, a pair of telescoping tubes which may be placed in torque transmitting engagement with each other are provided with a profiled hub on the outer tube at the end thereof where the inner tube is inserted, with the profiled hub consisting essentially of formed inserts in a number corresponding to a number of ribs provided on the inner tube, with contact faces being provided on both sides of the inserts in the circumferential direction to correspond to the shape of the ribs, the insert being held in rotationally fixed engagement with the outer tube.

9 Claims, 5 Drawing Figures

PROFILED HUB FOR DRIVE SHAFT ASSEMBLY

The present invention relates generally to drive shaft assemblies and more particularly to a profiled hub for a drive shaft assembly especially useful for driving agricultural implements or machines from the power take-off shaft of a tractor.

Drive shaft assemblies of the type to which the invention relates generally consist of at least two telescopic tubes, one of which is movable inside the other which, for torque transmitting purposes, are provided at least on the inner telescopic tube with axially extending radially outwardly directed ribs.

Length adjustable drive shafts which consist of profiled tubes having radially outwardly directed ribs are known from the prior art, for example, in DE-PS No. 10 02 169. However, the disadvantage of a design such as that of the prior art is that all the tubes forming the drive shaft assembly must be profiled tubes. As the production of such profiled tubes tends to be relatively complicated, the entire drive shaft assembly is correspondingly expensive.

Additional costs arise due to the fact that a drive shaft assembly must be provided at both ends with connecting parts such as joints or other couplings and this requires that non-cylindrical apertures matching the profiled tubes must be produced.

Accordingly, the invention is directed toward the provision of a profiled hub for a drive shaft assembly which, although using materials especially suitable for the respective requirements, can nevertheless be produced at low cost while being easily adaptable to torque transmission requirements to the design of the associated inner telescopic tube of the assembly.

SUMMARY OF THE INVENTION

Briefly, the present invention may be described as a drive shaft assembly especially for driving agricultural implements from the power take-off shaft of a tractor, comprising: an inner and an outer telescoping tube adapted for torque transmission therebetween, said inner tube being movable within the outer tube with at least said inner tube being provided with axially extending radially outwardly directed ribs; a profiled hub on said outer tube at the end thereof where said inner tube is inserted thereinto; formed inserts provided in said profiled hub in a number corresponding to the number of said ribs provided in said inner tube, said inserts being held in rotatively fixed engagement with said outer tube and having an inner curvature which corresponds to the outer diameter of said inner tube; and contact faces provided on both sides of said formed inserts in the circumferential direction thereof corresponding to the shape of said ribs.

Accordingly, in accordance with the invention, the advantages thereof are achieved in that (a) the outer one of the telescoping tubes at the insertion end thereof is provided with the profiled hub,
(b) the profiled hub is formed to consist of inserts which correspond to the number of ribs of the associated inner telescopic tube held non-rotatably in the outer telescopic tube, and
(c) the formed inserts whose curvature corresponds to the outer diameter of the associated inner telescopic tubes have been provided in the circumferential direction on both sides with contact faces corresponding to the shape of the ribs.

The advantage of the embodiment in accordance with the invention is that formed inserts can be produced by cold extrusion or forging, for example, and there is no need for expensive processes requiring internal broaching.

Furthermore, because of the small amount of material which is required, the formed inserts may be made of high strength material with good sliding properties.

It would be even possible to use sintered inserts, the costs of which are acceptable, and which may be provided with permanent lubrication in a manner known in the art.

Furthermore, the profiled hub of the invention may be used in connection with profiled tubes with any number of ribs and may therefore be produced as a standard part.

A further advantage of the invention consists in the fact that in connection with the profiled hub, it is possible to use a round tube as a telescopic tube. This means that if one end is provided with a coupling, such as a friction coupling or a switch-off coupling, there will be no weakening of the cross-section of the coupling hub which may be caused by the ribs required in conventional designs.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which are are illustrated and described preferred embodiments of the invention.

DETAILED DESCRIPTION OF THE PREFERRED EMBODIMENTS

Figure 1:
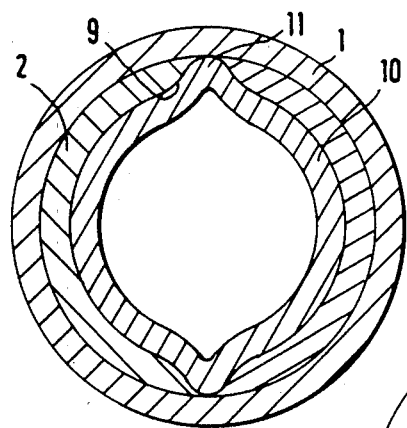
FIG. 1 is a cross-sectional view taken through a pair of telescopic tubes in accordance with the invention having two formed inserts.

Referring now to the drawings and initially more particularly to FIG. 1, there is shown in cross-section an assembly comprising an outer telescopic or profiled tube 1 and an inner telescopic or profiled tube 10. Within the outer profiled tube 1, there are provided two formed inserts 2 which are held by a welded joint, for example. At their ends, the formed inserts 2 are provided with contact faces 9 having a shape which corresponds to the shape of beads 11 which are provided on the inner profiled tube 10.

Figure 2:
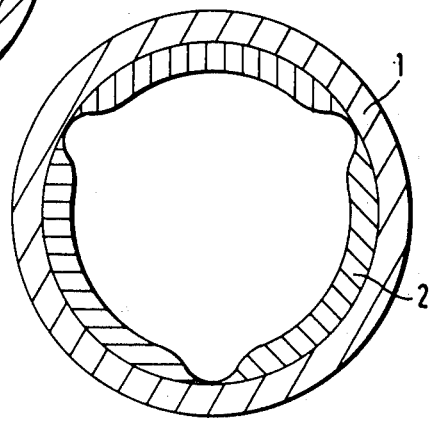
FIG. 2 is a sectional view showing only the outer telescopic tube in an embodiment formed with three formed inserts.

FIG. 2 shows a cross-section of a profiled hub in the case of which the outer profiled tube 1 accommodates three formed inserts which cooperate with an inner telescopic tube 10 provided with three beads 11.

Figure 3:
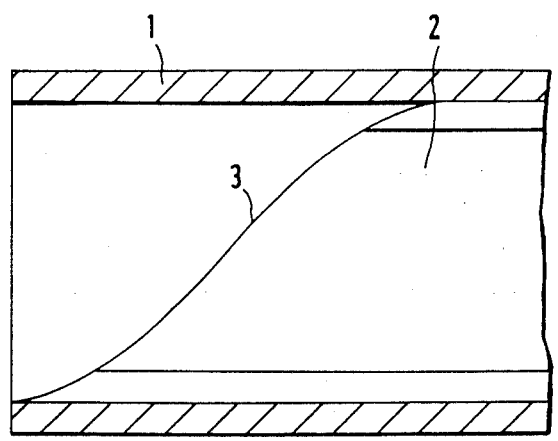
FIG. 3 is a longitudinal sectional view through an outer telescopic tube having a formed insert wherein a running-in inclination is formed extending between two contact faces in the same direction.

FIG. 3 illustrates a profiled hub in the case of which formed insert 2 between the two contact faces 9 extend in the same direction. In the embodiment of FIG. 3, the formed inserts 2 are provided with a running-in inclination 3. The design shown in FIG. 3 is intended for use for automatic drive shaft couplers.

Figure 4:
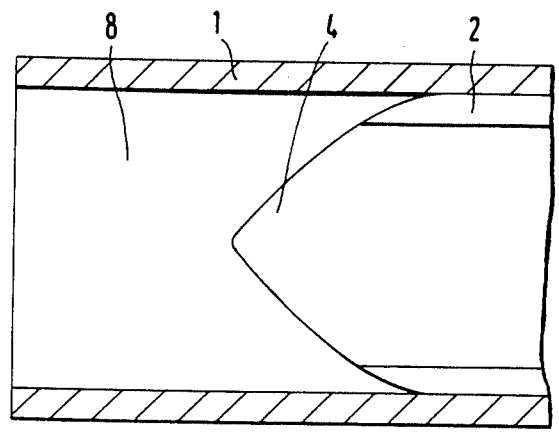
FIG. 4 is a longitudinal sectional view taken through an outer telescopic tube having a formed insert which is offset toward the inside relative to the insertion end and which is provided with a point tapered toward the insertion end.

FIG. 4 shows another embodiment of the invention comprising a profiled hub in the case of which an insert 2 tapered to a point toward the direction of insertion is offset toward the inside relative to the insertion end, so that a cylindrical receiving projection 8 is formed which serves the insertion of the inner telescopic tube and which aligns both telescopic tubes relative to each other in the axial direction so that, subsequently, simply by rotation, they may be made to engage.

Figure 5:
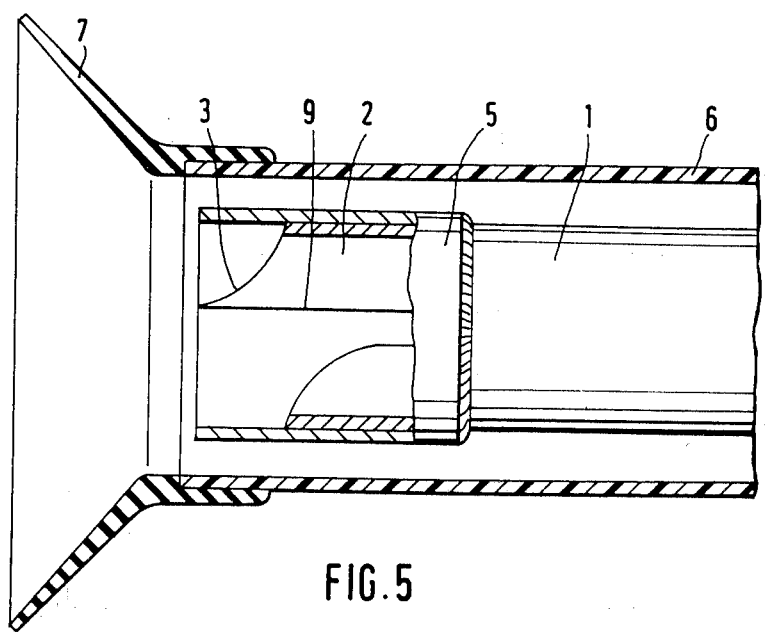
FIG. 5 is a sectional view illustrating a profiled hub formed from a tube section.

FIG. 5 illustrates a profiled hub formed of a tube section 5 which is connected to the outer profiled tube 1, in this case by welding. Within the tube section 5, provision has been made for formed inserts 2 which include a running-in inclination 3 which extends in the same direction and which, in the direction of rotation, ensures that the contact faces will rest fully on the ribs 11 of the inner telescopic tubes 10.

In FIG. 5, the outer telescopic tube 1 is surrounded by a protective tube 6 which is connected to an introducing funnel 7 whose function is to align the inner telescopic tube 10 relative to the insertion end of the outer telescopic tube 1.

Thus, it will be seen from the foregoing that as shown in the example of FIG. 4, the formed inserts 2 are provided with points 4 which start from their contact faces 9 and taper uniformly toward the insertion end in the circumferential direction.

As will be noted, the formed inserts 2 may be provided with running-in inclinations 3 directed toward the insertion end and extending in the same direction between the two contact faces.

The formed inserts 2 may be axially offset toward the inside relative to the insertion end of the outer telescopic tube 1 and the formed inserts 2 are held in the outer telescopic tube 1 by means of a welded joint.

Of course, other joints may be provided and the formed inserts 2 may also be held in the outer telescopic tube 1 by means of a glued joint or a screwed connection.

As shown in FIG. 5, the formed inserts 2 are received in a tube section 5 provided for the purpose of connection with the outer telescopic tube 1.

In accordance with the invention, advantageous results may be achieved in that the formed parts may be provided with points starting from their contact faces and tapered uniformly toward the insertion end in the circumferential direction.

Designing the formed inserts at the insertion end as externally extending points facilitates the insertion of the associated telescopic tube which is particularly advantageous in cases where profiled hubs are used in connection with an automatic drive shaft coupler using a slip coupler or length adjustment as the separating point.

In accordance with a further feature of the invention, the formed inserts may be provided with the running-in inclinations 3 directed toward the insertion end and extending in the same direction between the two contact faces. This embodiment also facilitates the use of profiled hubs in connection with an automatic drive shaft coupler, with this design having the additional advantage that if the running-in inclination 3 extends in the direction opposite to the direction of rotation, there is no covering loss which would have an unfavorable effect on the torque to be transmitted.

In a further advantageous embodiment of the invention, the formed inserts are axially offset toward the inside relative to the insertion end of the outer telescopic tubes. It will be seen that this embodiment also has a favorable effect with regard to putting the drive shaft parts together because during the insertion process the inner telescopic tube will be initially aligned axially relative to the profiled hub and, subsequently, by rotation, it may be made to engage in a form fitting manner.

In accordance with a further advantageous feature of the invention, the formed inserts may be held in the outer telescopic tube by means of a welded joint. The formed inserts are connected to the cylindrical tube which receives them in the simplest possible way by, for example, point welding.

Of course, as previously indicated, a glued joint may be provided and with certain starting materials the advantage of a glued connection as compared with a welded joint is that no heating will be required which might alter the structure of the formed inserts or of the telescopic tube.

In a further embodiment of the invention, the formed inserts are received in a tube section provided for the purpose of connection with the outer telescopic tube. The advantage of this design is that the profiled hub may be produced separately in order to suit the corresponding inner telescopic tube and that, in accordance with existing requirements, it can be inserted into any cylindrical tube already provided with a joint or coupling by suitably connecting both parts.

Accordingly, from the foregoing, it will be seen that the objectives of the invention are achieved in that there is provided a profiled hub for the outer telescopic tube of a drive shaft assembly which makes it possible to utilize a round tube as the shaft part. In accordance with the invention, at the insertion end of the round tube, provision is made for formed inserts from which an inner profile corresponding to the outer profile of the inner telescopic tube is formed.

While specific embodiments of the invention have been shown and described in detail to illustrate the application of the inventive principles, it will be understood that the invention may be embodied otherwise without departing from such principles.

What is claimed is:

1. A drive shaft assembly especially for driving agricultural implements from the power take-off shaft of a tractor, comprising:

a pair of telescoping tubes adapted for torque transmission therebetween including an inner telescopic tube movable within an outer telescopic tube with at least said inner tube being provided with axially extending radially outwardly directed beads;

said outer tube being internally cylindrical at at least one end thereof and being provided at said at least one end with a plurality of inserts non-rotatably secured therein for insertion of said inner tube therein;

said plurality of inserts providing for said other tube an internal profile complementary to the external profile of said inner tube and said beads, with the number of said inserts in said outer tube corresponding to the number of said beads on said inner tube.

2. A drive shaft according to claim 1, wherein said inserts together provide a profile having an inner radius of curvature corresponding to the outer radius of curvature of said inner tube and defining contact faces corresponding to the cross-sectional profile of the beads on said inner tube.

3. A drive shaft according to claim 1, wherein said inserts provide contact faces for said beads on said inner tube, said contact faces being configured to taper axially and circumferentially toward the insertion end of said outer tube.

4. A drive shaft according to claim 1, wherein each of said inserts is provided with an inclined surface toward the insertion end of said outer tube operating to guide said inner tube into said insertion end of said outer tube.

5. A drive shaft according to claim 1, wherein said inserts are axially spaced from the outermost end of the insertion end of said outer tube.

6. A drive shaft according to claim 1, wherein said inserts are non-rotatably secured in said outer tube by means of welded joints.

7. A drive shaft according to claim 1, wherein said inserts are non-rotatably secured within said outer tube by means of an adhesive joint.

8. A drive shaft according to claim 1, wherein said inserts are non-rotatably secured within said outer tube by means of a screw-threaded connection.

9. A drive shaft according to claim 1, further comprising a tubular element connected with said outer tube wherein said inserts are provided within said tubular element.

* * * * *